United States Patent
McGuffin

(10) Patent No.: US 8,199,722 B2
(45) Date of Patent: Jun. 12, 2012

(54) METHOD AND SYSTEM FOR DATALINK GROUND STATION SELECTION

(75) Inventor: Thomas F. McGuffin, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 684 days.

(21) Appl. No.: 12/350,731

(22) Filed: Jan. 8, 2009

(65) Prior Publication Data

US 2010/0172328 A1    Jul. 8, 2010

(51) Int. Cl.
*H04W 4/00* (2009.01)

(52) U.S. Cl. ......................... 370/332; 455/436

(58) Field of Classification Search .................. 370/329, 370/330, 331, 332, 334; 455/436, 437, 442, 455/431, 432

See application file for complete search history.

(56) References Cited

U.S. PATENT DOCUMENTS

| | | | |
|---|---|---|---|
| 4,419,766 A * | 12/1983 | Goeken et al. | 455/62 |
| 4,549,311 A | 10/1985 | McLaughlin | |
| 6,289,202 B1 | 9/2001 | Kikuchi | |
| 6,430,412 B1 * | 8/2002 | Hogg et al. | 455/436 |
| 2006/0217851 A1 | 9/2006 | McGuffin et al. | |

* cited by examiner

*Primary Examiner* — Huy D Vu
*Assistant Examiner* — Dady Chery
(74) *Attorney, Agent, or Firm* — Fogg & Powers LLC

(57) ABSTRACT

A method for selecting a ground station for communication with an aerial vehicle is provided. The method comprises receiving at an aerial vehicle one or more messages from one or more ground stations. The method includes storing one or more signal strength values corresponding to the one or more received messages in a data structure for each respective one or more ground stations received during a predefined time period. The data structures for each of the one or more ground stations is updated. The average of the signal strength values stored in each data structure is calculated. The method compares the average signal strength of each of the one or more ground stations and selects which ground station the aerial vehicle is to communicate with based on predefined criteria.

15 Claims, 6 Drawing Sheets

METHOD AND SYSTEM FOR DATALINK GROUND STATION SELECTION

BACKGROUND

Many aircraft are equipped with air-ground data communication equipment for data communication with radios on the ground. These radios on the ground are known as ground stations. Typically, one frequency is used by most of the ground stations in a geographic region such as North America or Europe. The network design requires the avionics to select with which ground station to communicate. The ground station selection logic in the avionics evaluates several parameters including signal strength and location to select which ground station to use.

Usually the ground station selection logic has a fixed signal strength threshold. If the currently selected ground station's signal strength goes below this threshold, the selection logic triggers a handover to another ground station, if one is available. Typically, current ground station selection logic uses only the signal strength of the last message received in determining if the signal strength is below threshold. Field data shows that signal strength can vary considerably, up to 20 dB, from message to message. If the last message had an unusually low signal strength, this can cause the avionics to handoff to a different ground station when it should not. Therefore, using just the last value for signal strength creates additional switching and overhead, thus reducing the efficiency of the network.

Additionally, the signals in such networks are aperiodic, meaning there is not a consistent number of signals received in any given period of time. However, typically there should be a signal every 2 minutes and frequently there are signals more often. The time varying nature of the messages affects attempts to filter or average the data.

Accordingly, there is a need for improved ground station selection logic which overcomes the foregoing deficiencies.

SUMMARY

In one embodiment, a method for selecting a ground station for communication with an aerial vehicle is provided. The method comprises receiving at an aerial vehicle one or more messages from one or more ground stations. One or more signal strength values corresponding to the one or more received messages are stored in a data structure for each respective one or more ground stations received during a predefined time period. The method comprises updating the data structure for each of the one or more ground stations. The average of the signal strength values stored in each data structure is calculated to determine an average signal strength, and the average signal strength of each of the one or more ground stations is compared. The method further comprises selecting which ground station the aerial vehicle is to communicate with based on predefined criteria.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention includes a method, system, and computer program product for selecting a ground station for communication with an aerial vehicle when there are multiple ground stations in range. Which ground station to communicate with is selected based on averaging a set of received messages for each ground station and comparing the averages. By averaging the signal strength for a set of messages instead of comparing just the last received message for each station, the avionics in the aerial vehicle will not initiate handovers as often.

Signal strength is a measurement of the magnitude of the transmitter's electric field taken at the point of interest. In the present invention, "signal strength" or "signal strength value" generally refers to the strength of the message an aerial vehicle receives from a ground station. As used herein, "aerial vehicle" can include any aircraft such as airplanes, helicopters, hot air balloons, and the like. The term "ground station" can include radio stations, air traffic control towers, cell towers, and the like. To achieve the best communication link, it is typically desired that an aerial vehicle use the ground station with the strongest signal available. Signal strength varies for several reasons, including the distance between the vehicle and the ground station, transmitter power, altitude, conditions of the propagation path, destructive interference, and the like.

Figure 1:
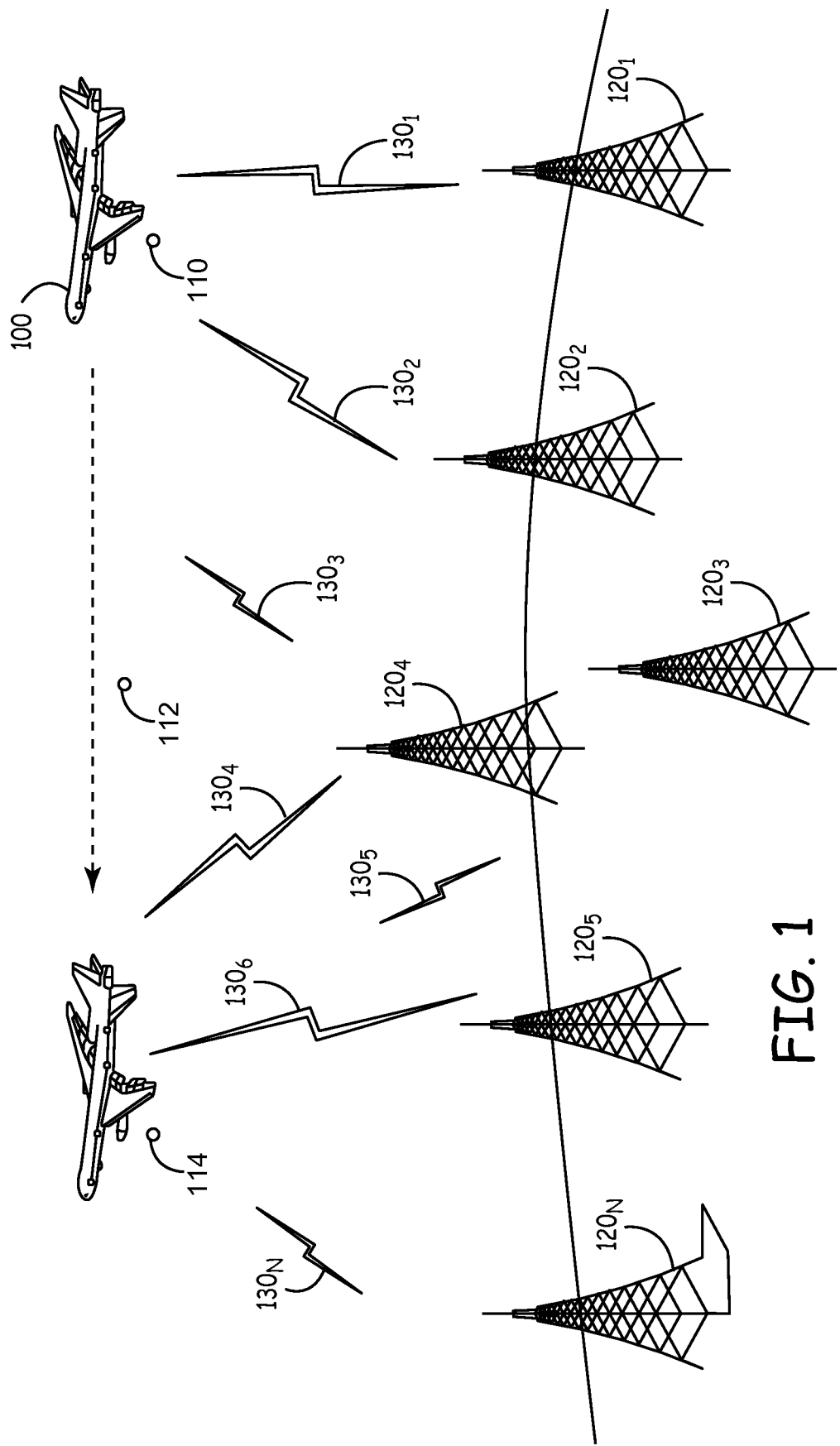
FIG. 1 illustrates an aircraft in communication with a plurality of ground stations over the course of flight.

FIG. 1 illustrates an aircraft 100 in communication with a plurality of ground stations $120_1$ through $120_N$ over the course of flight. At one moment during flight, aircraft 100 is at a location 110. While aircraft 100 is at location 110, aircraft 100 is receiving messages 130 from a plurality of ground stations 120. Aircraft 100 may receive messages 130 from all ground stations 120 or from a subset of ground stations 120. Messages 130 received may vary in strength. For example, as shown in FIG. 1, when aircraft 100 is at location 110, aircraft 100 is receiving messages $130_1$, $130_2$, and $130_3$ from ground stations $120_1$, $120_2$, and $120_4$, respectively. In this example, of the messages 130 received by aircraft 100, message $130_1$ is the strongest. To have the most reliable possible communications, it is desirable that aircraft 100 communicate with the ground station from which aircraft 100 receives the strongest signal. In this example, aircraft 100 would select ground station $120_1$ to communicate with since ground station $120_1$ transmitted the strongest signal, namely message $130_1$.

At a later moment during flight, aircraft 100 is at a location 114. At location 114, aircraft 100 receives messages from a different subset of ground stations 120 than at location 110. As shown in FIG. 1, when aircraft 100 is at location 114, aircraft 100 is receiving messages $130_4$, $130_5$, $130_6$, and $130_N$ from ground stations $120_4$, $120_3$, $120_5$, and $120_N$, respectively. In this example, of the messages 130 received by aircraft 100, message $130_6$ is the strongest. At location 114, it may be desirable for aircraft 100 to select, or handoff to, ground station 120₅ since ground station 120₅ is transmitting the strongest signal.

Usually ground station selection logics have a fixed threshold for handoffs. When the signal strength goes below the minimum threshold value, the logic transfers the communications to another ground station. One advantage of selecting a ground station 120 based not solely on signal strength is that it may reduce the number of handoffs during a given communication. Reducing the number of handoffs results in less overhead and a more efficient network. Referring to FIG. 1, at least once during flight from location 110 to location 114, aircraft 100 handed over communications from a previous ground station to a different ground station which had greater received signal strength. For example, at location 110, ground station 120₁ was being used, while at location 114, ground station 120₅ is being used, thus there was at least one handoff during flight.

The number of handoffs may be reduced by smoothing out any nulls or unusually low signals received from the ground stations 120. In one embodiment, a number of consecutive signal strengths may be averaged for each ground station 120. For example, the last four signals received from each ground station are averaged. However, any number of signal strengths may be used. Averaging the signal strength of the last four messages produces a better indication of signal strength as compared with using only the signal strength of the last message received. However, the time period it took to receive these four signals may vary considerable. For example, it may have taken as long as eight minutes or as short as 0.5 seconds to receive the four messages. This potential disparity could give a very different indication of the desirability of that ground station.

In one embodiment, signal strengths may be averaged over a period of time. In another embodiment, the number of samples averaged for each ground station varies based on the message traffic density of that ground station. Message traffic density is a measure of how many messages are received per unit of time. In one embodiment, the number of data values used is adjusted so that the data used covers similar time periods regardless of message traffic density. Comparing ground stations with data from similar time periods is a more reliable comparison than only comparing the last message received. This method of comparison is also more reliable than comparing average signal strength from each ground station where the averages may be from different time periods. The time varying nature of the messages affects attempts to filter or average the data. Taking this varying nature into account would result in a more accurate picture of the signal strength.

When the message traffic from a ground station is high, more data is used to calculate the average signal strength. For example, if four messages were being received per minute, then sixteen samples would be used to calculate the average signal strength for a four minute period. When the message traffic from the ground station is low, then less data is used to calculate the average signal strength. In the four minute example, if the message traffic density was one message per minute, then four samples could be used to calculate the average signal strength. Using this method eliminates the influence of message traffic density when the ground station selection logic is comparing a ground station with low message traffic density to a ground station with high message traffic density.

Figure 2:
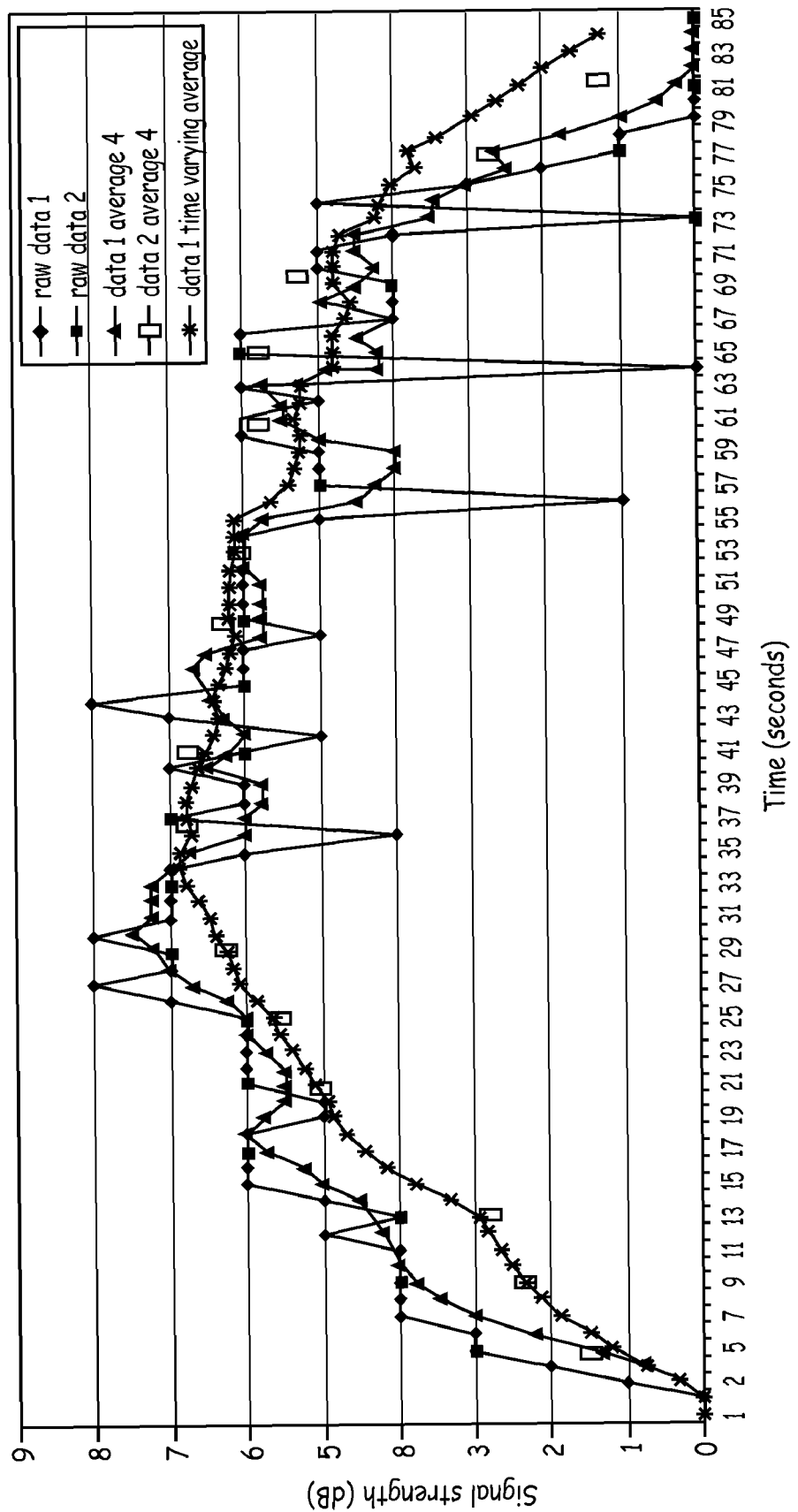
FIG. 2 is a graph of signal strength as a function of time for two ground stations.

FIG. 2 is a graph of signal strength as a function of time for two ground stations. The first ground station, corresponding to raw data 1, has high message traffic density. The second ground station, corresponding to raw data 2, has low message traffic density. In this example, ground station 2 is defined as every fourth signal transmitted by ground station 1. Because ground station 2 transmitted only a fourth of the total messages that ground station 1 transmitted, ground station 2 has lower message traffic density than ground station 1.

FIG. 2 also depicts running average values of the signal strength for ground stations 1 and 2, shown as triangles and squares, respectively. The graph also contains the time varying average for ground station 1 as calculated in one embodiment of this invention, shown as asterisks. As can be seen in the graph, it is more accurate to compare the two ground stations using the time varying average than just the running average.

Figure 3:
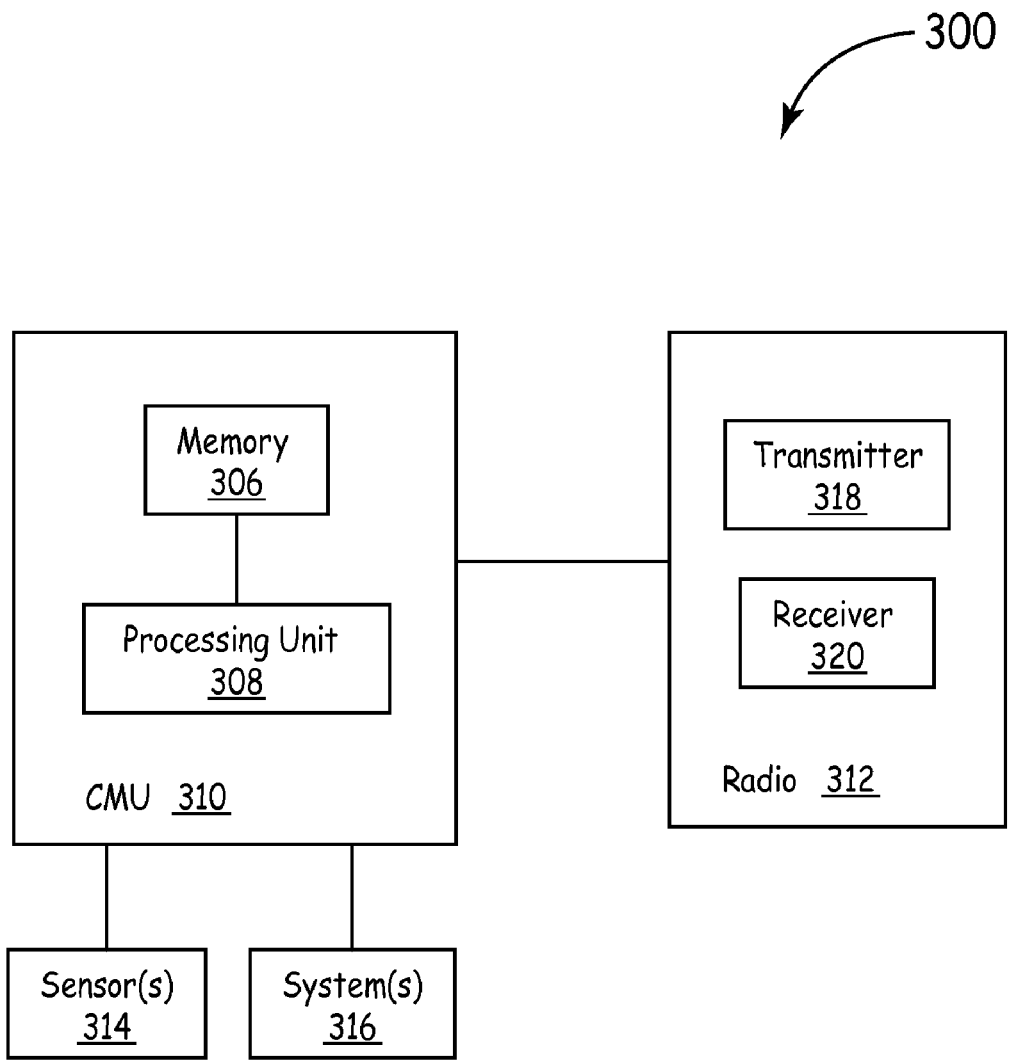
FIG. 3 is a block diagram of one embodiment of an avionics communication system in an aircraft.

FIG. 3 is a block diagram of one embodiment of an avionics communication system in an aircraft. System 300 includes a communications management unit (CMU) 310 which communicates with a radio 312 to transmit and receive signals as well as to implement the message traffic density level. System 300 also includes one or more sensors 314 and one or more onboard systems 316 coupled to CMU 310. Sensors 314, such as fuel consumption sensors, altitude sensors, and the like provide data to CMU 310 for transmission to a ground station 120. Similarly, onboard systems 316, such as a Flight Management System (FMS), provide data to CMU 310 for transmission to the ground station.

Radio 312 transmits data from CMU 310 to a ground station 120. Radio 312 also provides data received from a ground station 120 to CMU 310. In particular, radio 312 includes a transmitter 318 operable to modulate and upconvert data from CMU 310 for transmission over a selected radio frequency channel as known to one of skill in the art. Similarly, receiver 320 in radio 312 is operable to downconvert and demodulate received RF signals from a ground station 120 for processing by CMU 310 as known to one of skill in the art. It is to be understood that, although transmitter 318 and receiver 320 are shown as separate devices in FIG. 3, in some implementations, receiver 318 and transmitter 320 are integrated into a single device, referred to as a transceiver. In addition, radio 312 measures the signal strength of signals received from ground stations 120 within range of radio 312. Radio 312 provides the measured signal strength for each ground station 120 to CMU 310 for use in selecting a ground station with which to communicate.

CMU 310 comprises a processing unit 308 and a memory 306. Processing unit 308 can be implemented using software, firmware, hardware, or any appropriate combination thereof, as known to one of skill in the art. By way of example and not by way of limitation, the hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA). In this exemplary embodiment, processing unit 308 includes or functions with software programs, firmware or computer readable instructions for carrying out various methods, process tasks, calculations, and control functions, used in calculating a message traffic density level for switching ground stations. These instructions are typically tangibly embodied on any appropriate medium used for storage of computer readable instructions or data structures. In particular, in this embodiment, the instructions are stored on memory 306.

The memory 306 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The processor 308 may be located on the aerial vehicle 100, at a central control station, or at any other suitable location. The processor 308 may include avionics software. The processor 308 maintains a data structure for each ground station 120 from which the aerial vehicle 100 receives data. Processing unit 308 creates a data structure in memory 306 to store signal strengths corresponding to the received messages. A number of signal strength samples corresponding to the received messages from each ground station 120 are stored for a given period of time in memory 306. Processing unit 308 updates the data structure in memory 306 to include the signal strengths of new messages as they arrive and to delete the signal strengths of old messages as they become stale.

Figure 4:
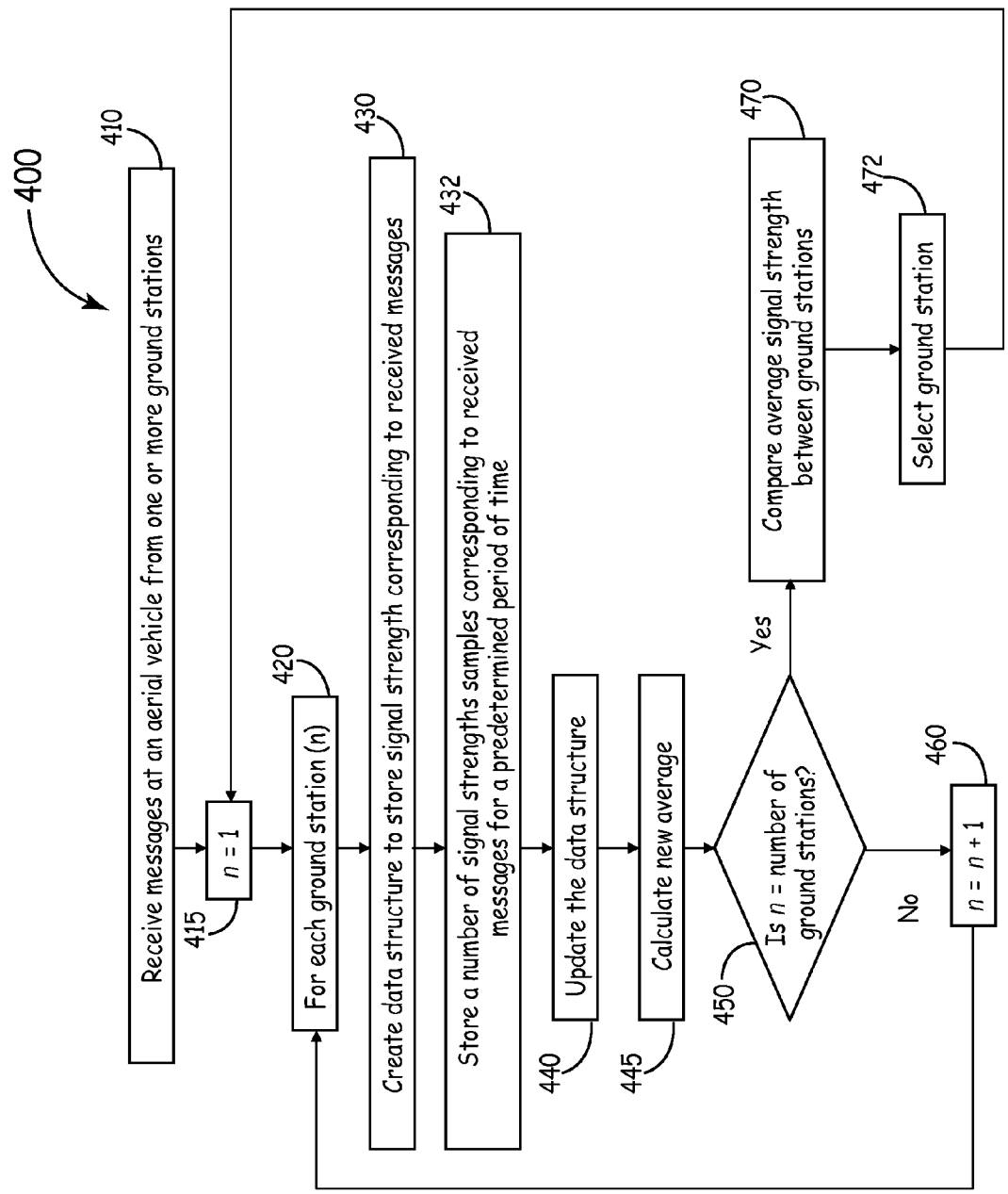
FIG. 4 is a flowchart depicting one embodiment of a method for an aerial vehicle to select a ground station.

FIG. 4 is a flowchart depicting one embodiment of a method 400 for an aerial vehicle to select a ground station. In some embodiments, at least a portion of method 400 is implemented in processor instructions stored on memory 306 and executed by processing unit 308. Method 400 begins at block 410 with an aerial vehicle receiving messages from one or more ground stations. At block 415 a dummy variable, n, is set equal to 1. The integer n corresponds to the number of ground stations from which the aerial vehicle can receive messages. At block 420, the method 400 enters a loop for each ground station n which culminates at block 460. At block 430, a data structure is created to store signal strengths corresponding to the messages received by the aerial vehicle from the ground stations. If a data structure for a ground station already exists, a new data structure will not be created.

At block 432, a number of signal strengths are stored corresponding to the messages received from the ground station. In one embodiment, the number of signal strengths to be stored will be based on a predetermined time period. The data structure contains the signal strength for each message from its corresponding ground station received during the predetermined time period. For example, a data structure could contain signal strengths only from messages received within the last four minutes. The data structure can contain any number of samples, such as four, sixteen, or any other number. In another embodiment, the number of signal strengths to be stored will be based on message traffic density over a predetermined time period.

Figure 5:
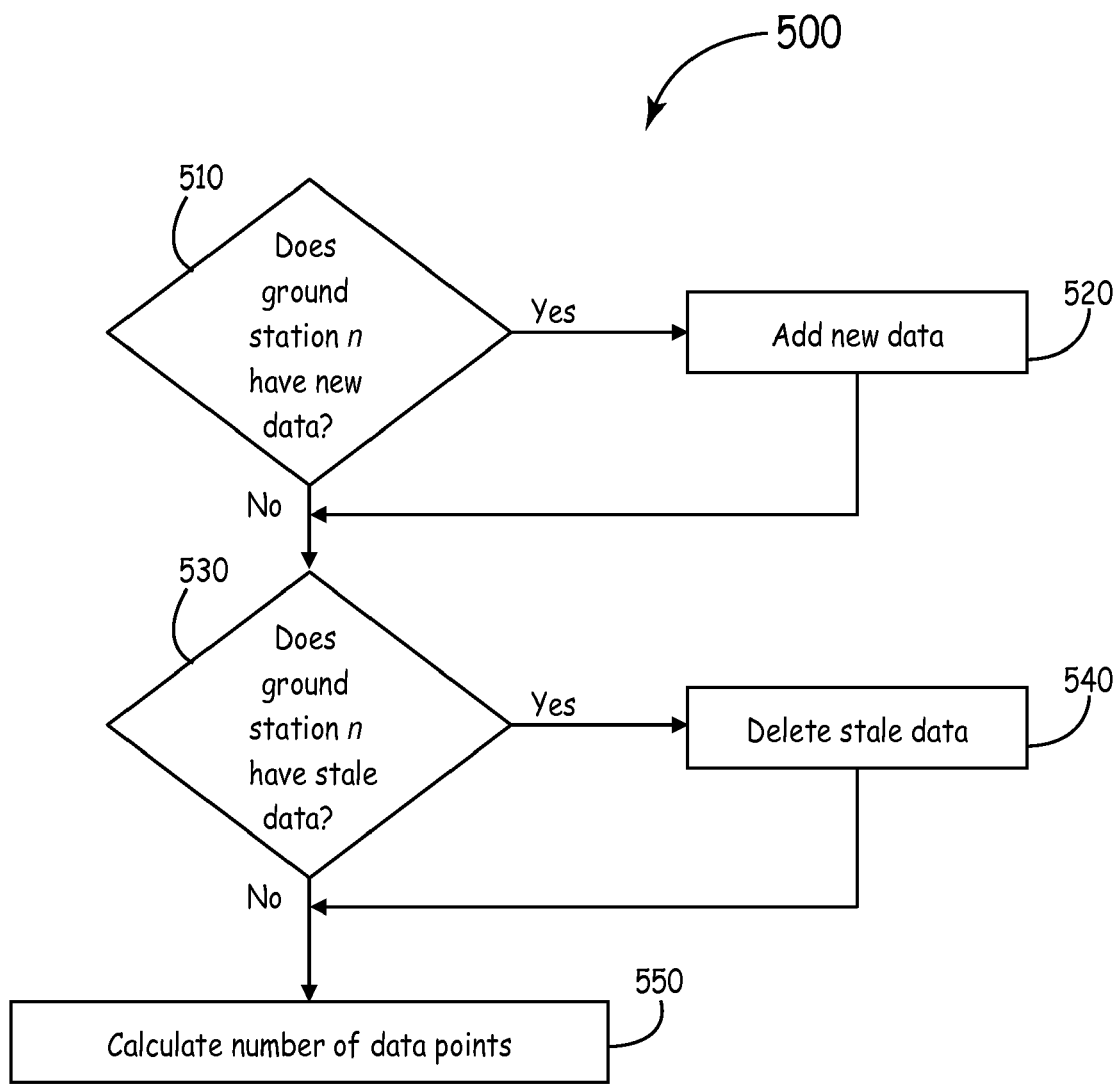
FIGS. 5 and 6 are flowcharts depicting methods for updating a data structure.
Figure 6:
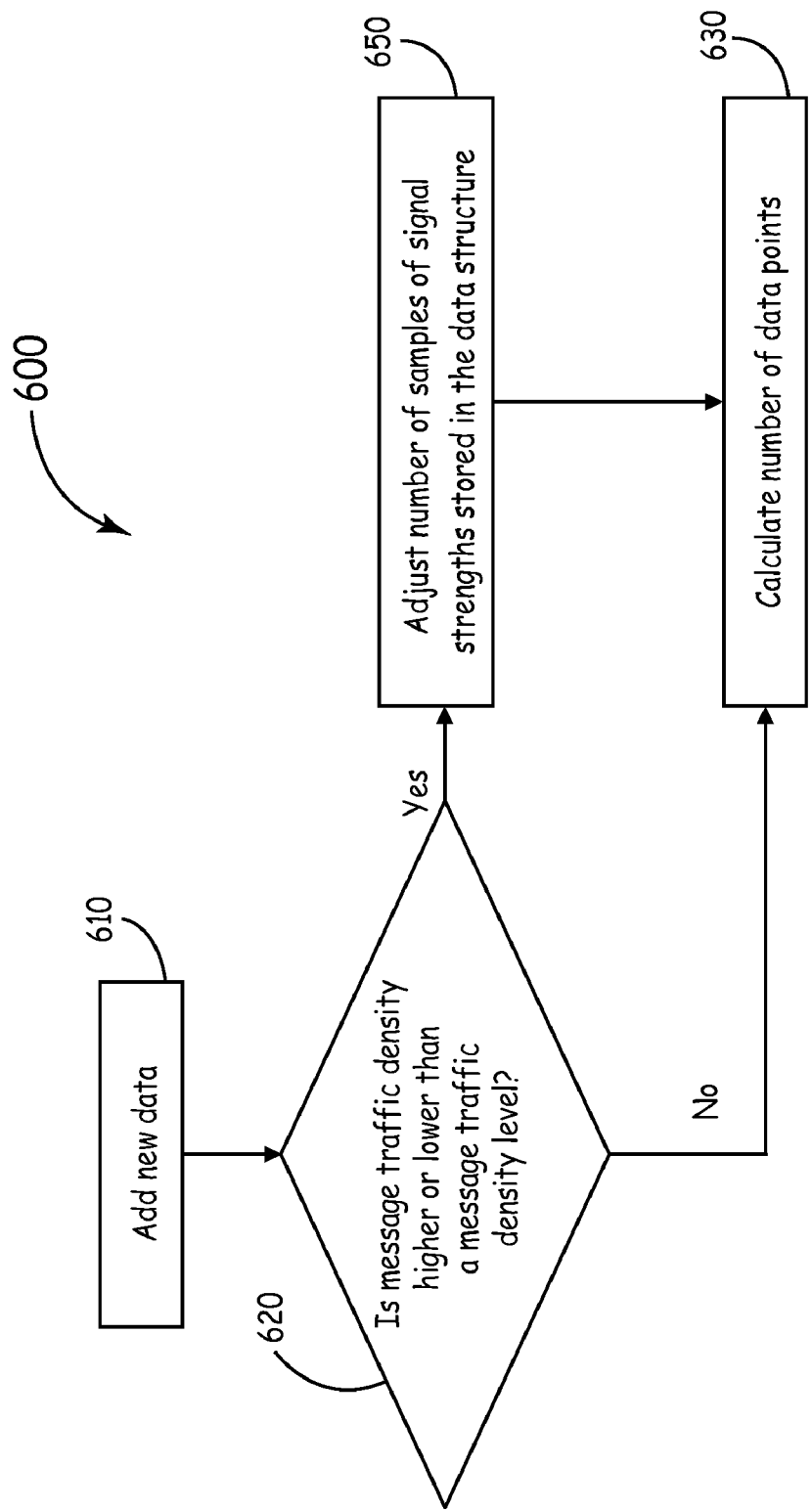

At block 440, method 400 updates the data structure. FIGS. 5 and 6 are flowcharts depicting methods 500 and 600 for updating a data structure. In FIG. 5, the method 500 queries whether ground station n has new data at block 510. If ground station n does not have new data to add, method 500 proceeds to block 530. If ground station n has new data to add, method 500 proceeds to block 520 then to block 530. The method 500 queries whether a ground station n has stale data at block 530. If ground station n does not have stale data, the method 500 proceeds to block 550. If ground station n has stale data, method 500 proceeds to block 540.

At block 520, new data is added. New data can include a single piece or several pieces of data. For example, if n=1 and the aerial vehicle has just received a message from the ground station designated as 1, then the method 500 has new data to add to that ground station's data structure. Addition of data includes the signal strength of the received message. In one embodiment, each new data point has an associated time stamp so the method 500 can determine when the data point is stale. In another embodiment, the signal strength of each additional message stored replaces the oldest stored signal strength in the data structure.

At block 540, stale data is deleted. Stale data can include a single piece or several pieces of data. In one embodiment, stale data is defined as any data that is older than a predefined time period. When a data sample is older than a given time period, the data sample is deleted and the number of data samples used in the average is decreased until new data is received. For example, any signal strength data recorded that is older than 10 minutes would be stale data. Once all the stale data has been deleted from the data structure, method 500 proceeds to block 550, where the number of data points in the data structure is calculated.

FIG. 6 depicts one embodiment of a method 600 for updating a data structure. At block 610 new data is added to the data structure for ground station n. In one embodiment, all received messages' signal strengths from the same time period are stored in the data structure regardless of message traffic density. At block 620, method 600 queries whether message traffic density for the ground station is higher or lower than a given message traffic density level. In one embodiment, the message traffic density level may be a single message traffic density value (for example, 10 messages per minute). In another embodiment, the message traffic density level may be a range of potential message traffic densities (for example, 8-12 messages per minute). If the message traffic density for ground station n is different than the message traffic density level, or outside the predetermined range, method 600 proceeds to block 650.

At block 650, the number of signal strength samples stored in the data structure is adjusted based on message traffic density. In one embodiment, if the message traffic density is high, more samples of signal strength are used. In another embodiment, if the message traffic density is low, less samples of signal strength are used. Adjusting the number of signal strength samples used based on message traffic density in this manner gives a more accurate picture of the actual signal strength at any given moment. After adjusting the number of signal strength samples stored, the method proceeds to block 630.

Returning to block 620, if the message traffic density is at the message traffic density level or within the message traffic density range, method 600 proceeds to block 630. At block 630, the number of data points is calculated.

Returning to FIG. 4, once the data structure is updated at block 440, new averages of the signal strengths stored in the data structure for ground station n are calculated at block 445. In one embodiment, the average may be weighted. In one embodiment, the average is stored in the data structure. The method 400 then proceeds to block 450. Block 450 queries whether n is equal to the total of number of ground stations in communication with the aerial vehicle. If no, method 400 proceeds to block 460, where n is increased by 1. Then, method 400 repeats the loop beginning at block 420 for the next ground station. If, at block 450, n is equal to the total number of ground stations in communication with the aerial vehicle, method 400 proceeds to block 470.

At block 470, the average signal strengths of each of the ground stations are compared. At block 472, a ground station is selected for communication with the aerial vehicle based on predefined criteria. In one embodiment, the predefined criterion is to select the ground station with the highest average signal strength. If the aerial vehicle was not already in communication with the ground station having the largest average signal strength, a handover is initiated to the ground station that does have the largest average signal strength. In another embodiment, the predefined criterion is to select the ground station with the largest average signal strength if it is larger than the average signal strength from the currently used ground station by a signal strength threshold value. If so, a handover is initiated. If no ground station has average signal strength larger than the currently used ground station, a handover is not initiated.

In one embodiment, the processor 308 would periodically calculate and store the average signal strength using the number of data samples available during the time frame. In other words, method 400 would repeat starting at block 415. At block 415, n is reset to 1. Once n is reset to 1, method 400 returns to block 420 to repeat for each ground station. Initiation of repeating the loop for each ground station may be triggered by a period of time elapsing, after receiving a new message, after receiving every fourth new message, or the like.

Examples of information stored in a data structure are illustrated in Tables 1 through 4. As can be seen in Table 1, ground stations can have different message traffic densities. In Table 1, ground station 1 has sent 6 messages within the predefined time period. In this example, the predefined time period before a data point becomes stale is set to ten minutes. Within the last ten minutes, the aerial vehicle has received six messages from ground station 1, with signal strengths 1, 1, 2, 2, 1, and 2 dB in order from oldest to newest message received. These signal strengths average to 1.5 dB. In comparison, ground station 2 has sent three messages within the last ten minutes, and its average signal strength is 0.3 dB. Ground station 3 has transmitted five signals within the last ten minutes, with an average of 4.6 dB. When these averages are compared, the avionics determines that ground station 3 has the largest signal strength. If the aerial vehicle is already in communication with ground station 3 at the time of the comparison, the aerial vehicle will stay in communication with ground station 3. If the aerial vehicle is not already in communication with ground station 3, the avionics will initiate a handover to ground station 3.

TABLE 1

| GROUND STATION | MESSAGE TRAFFIC DENSITY | SIGNAL STRENGTH DATA (dB) | AVERAGE (dB) |
|---|---|---|---|
| 1 | 6 | 1, 1, 2, 2, 1, 2 | 1.5 |
| 2 | 3 | 0, 1, 0 | 0.3 |
| 3 | 5 | 6, 5, 3, 5, 4 | 4.6 |
| 4 | . | . | . |
| . | . | . | . |
| . | . | . | . |
| n | | | |

Table 2 also depicts information stored in a data structure. Table 2 is how Table 1 might look after the logic has updated the stored data and removed two data points from ground station 1 because they have become stale. Now ground station 1 has a message traffic density of four. However, the average signal strength for ground station 1 is still less than that for ground station 3, thus it is still preferred for the aerial vehicle to use ground station 3 for communications.

TABLE 2

| GROUND STATION | MESSAGE TRAFFIC DENSITY | SIGNAL STRENGTH DATA (dB) | AVERAGE (dB) |
|---|---|---|---|
| 1 | 4 | 1, 1, 2, 2 | 1.5 |
| 2 | 3 | 0, 1, 0 | 0.3 |
| 3 | 5 | 6, 5, 3, 5, 4 | 4.6 |
| 4 | . | . | . |
| . | . | . | . |
| . | . | . | . |
| n | | | |

Table 3 shows information stored in a data structure with ground station 2 updated from Table 2. Here, ground station 2 has transmitted more messages than it did in Table 2, as a new message with signal strength 2 dB has been received. Now ground station 2 has message traffic density of five and average signal strength of 0.8 dB. The aerial vehicle may have received a message with greater signal strength from ground station 2 for a number of reasons, such as perhaps the aerial vehicle is approaching ground station 2, or decreasing in latitude, or ground station 2 is now within line-of-sight.

TABLE 3

| GROUND STATION | MESSAGE TRAFFIC DENSITY | SIGNAL STRENGTH DATA (dB) | AVERAGE (dB) |
|---|---|---|---|
| 1 | 4 | 1, 1, 2, 2 | 1.5 |
| 2 | 5 | 0, 1, 0, 1, 2 | 0.8 |
| 3 | 5 | 6, 5, 3, 5, 4 | 4.6 |
| 4 | . | . | . |
| . | . | . | . |
| . | . | . | . |
| n | | | |

Table 4 show information stored in a data structure with ground stations 3 and 4 updated from Table 3. Here, the aerial vehicle has received a message from ground station 4 for the first time within the predefined time period, i.e. within the last ten minutes. In one embodiment, this data piece would remain in the data structure until ten minutes from its reception has elapsed.

TABLE 4

| GROUND STATION | MESSAGE TRAFFIC DENSITY | SIGNAL STRENGTH DATA (dB) | AVERAGE (dB) |
|---|---|---|---|
| 1 | 4 | 1, 1, 2, 2 | 1.5 |
| 2 | 5 | 0, 1, 0, 1, 2 | 0.8 |
| 3 | 6 | 6, 5, 3, 5, 4, 0 | 3.8 |
| 4 | 1 | 1 | 1 |
| . | . | . | . |
| . | . | . | . |
| n | | | |

In Table 4, the aerial vehicle has also received a new message from ground station 3, this with such low signal strength that it may be considered of zero signal strength. This new message reduces the average signal strength of ground station 3 from 4.6 dB to 3.8 dB. With ground station selection logic that only considers the previous received message's signal strength, had the aerial vehicle been in communication with ground station 3 at the time the zero signal strength message arrived, the ground station selection logic would have initiated a handover. But as is often the case, this zero signal strength message may be an aberration in the data, perhaps due to the aerial vehicle briefly flying past a tall building or banking In aspects of the invention, ground station selection logic would not trigger a handoff to another ground station because ground station 3 still has the highest average signal strength.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for selecting a ground station for communication with an aerial vehicle, the method comprising:
   receiving at an aerial vehicle one or more messages from one or more ground stations;
   storing one or more signal strength values corresponding to the one or more received messages in a data structure for each respective one or more ground stations received during a predefined time period;
   updating the data structure for each of the one or more ground stations;
   calculating an average of the signal strength values stored in each data structure to determine an average signal strength;
   comparing the average signal strength of each of the one or more ground stations;
   selecting which ground station the aerial vehicle is to communicate with based on predefined criteria; and
   adjusting the number of signal strength values stored in the data structures based on comparing the message traffic density for each of the one or more ground stations with a message traffic density level, wherein adjusting the number of signal strength values comprises:
      storing more signal strength values in the data structure corresponding to the one or more ground stations when the message traffic density between the aerial vehicle and the ground station is higher than the message traffic density level; and
      storing less signal strength values in the data structure corresponding to the one or more ground stations when the message traffic density between the aerial vehicle and the ground station is lower than the message traffic density level.

2. The method of claim 1, wherein updating the data structure for each of the ground stations comprises at least one of:
   deleting any signal strength value older than a predetermined time period; and
   deleting the oldest signal strength value stored in a data structure when that data structure stores a new signal strength value.

3. The method of claim 1, wherein selecting which ground station the aerial vehicle is to communicate with based on predefined criteria further comprises:
   determining a signal strength threshold value;
   comparing the largest average signal strength with the currently selected ground station's average signal strength; and
   switching to a ground station with the largest average signal strength only if the difference between the largest average signal strength and a currently selected ground station's average signal strength exceeds the signal strength threshold value.

4. The method of claim 1, wherein selecting which ground station the aerial vehicle is to communicate with based on predefined criteria further comprises:
   selecting the ground station with the largest average signal strength.

5. The method of claim 1, wherein calculating an average of the signal strength values stored in each data structure to determine an average signal strength further comprises:
   weighting the average in favor of more recently stored signal strength values.

6. A communication system for an aerial vehicle, comprising:
   a radio in the aerial vehicle to receive communication signals from one or more ground stations and to transmit to a selected ground station; and
   a management unit coupled to the radio and operable to:
      store one or more signal strength values corresponding to one or more received messages in a data structure for each respective one or more ground stations received during a predefined time period;
      update the data structure for each of the one or more ground stations;
      calculate an average of the signal strength values stored in each data structure to determine an average signal strength;
      compare the average signal strength of each of the one or more ground stations; and
      select which ground station the radio is to communicate with based on predefined criteria;
      wherein the update of the data structure for each of the one or more ground stations comprises:
         adjust the number of signal strength values stored in the one or more data structures based on comparing the message traffic density for each of the one or more ground stations with a message traffic density level, wherein the adjustment of the number of signal strength values comprises:
            store more signal strength values in the data structure corresponding to the one or more ground stations when the message traffic density between the radio and the ground station is higher than the message traffic density level; and
            store less signal strength values in the data structure corresponding to the one or more ground stations when the message traffic density between the radio and the ground station is lower than the message traffic density level.

7. The communication system of claim 6, wherein the update of the data structure for each of the one or more ground stations further comprises at least one of:
   delete any signal strength value older than a predefined time period;
   delete the oldest signal strength value stored in the data structure when that data structure stores a new signal strength value.

8. The communication system of claim 6, wherein the selection of which ground station the radio is to communicate with based on predefined criteria comprises:
   select the ground station with the largest average signal strength.

9. The communication system of claim 6, wherein the selection of which ground station the radio is to communicate with based on predefined criteria comprises:
   determine a signal strength threshold value;

compare the largest average signal strength with the selected ground station's average signal strength; and switch to a ground station with the largest average signal strength only if the difference between the largest average signal strength and a currently selected ground station's average signal strength exceeds the signal strength threshold value.

10. The communication system of claim 6, wherein calculate an average of the signal strength values stored in each data structure to determine an average signal strength further comprises:

weigh the average in favor of more recently stored signal strengths.

11. A computer program product, comprising:

a non-transitory computer readable medium having instructions stored thereon for a method of selecting a ground station, the method comprising:

storing one or more signal strength values corresponding to one or more received messages in a data structure for each respective one or more ground stations received during a predefined time period;

updating the data structure for each of the one or more ground stations;

calculating an average of the signal strength values stored in each data structure to determine an average signal strength;

comparing the average signal strength of each of the one or more ground stations;

selecting which ground station the aerial vehicle is to communicate with based on predefined criteria; and adjusting the number of signal strength values stored in the data structures based on comparing the message traffic density for each of the one or more ground stations with a message traffic density level, wherein adjusting the number of signal strength values comprises:

storing more signal strength values in the data structure corresponding to the one or more ground stations when the message traffic density between the aerial vehicle and the ground station is higher than the message traffic density level; and storing less signal strength values in the data structure corresponding to the one or more ground stations when the message traffic density between the aerial vehicle and the ground station is lower than the message traffic density level.

12. The computer program product of claim 11, wherein updating the data structure for each of the one or more ground stations comprises at least one of:

deleting any signal strength older than a given time period; and deleting the oldest signal strength stored in a data structure when that data structure stores a new signal strength.

13. The computer program product of claim 11, wherein selecting which ground station the aerial vehicle is to communicate with based on predefined criteria comprises:

selecting the ground station with the largest average signal strength.

14. The computer program product of claim 11, wherein selecting which ground station the aerial vehicle is to communicate with based on predefined criteria comprises:

determining a signal strength threshold value;

comparing the largest average signal strength with a currently selected ground station's average signal strength; and switching to a ground station with the largest average signal strength only if the difference between the largest average signal strength and a currently selected ground station's average signal strength exceeds the signal strength threshold value.

15. The computer program product of claim 11, wherein calculating an average of the signal strength values stored in each data structure to determine an average signal strength comprises weighting the average in favor of more recently stored signal strength values.

\* \* \* \* \*